United States Patent [19]

Wills et al.

[11] Patent Number: 5,421,603
[45] Date of Patent: Jun. 6, 1995

[54] FOLDING PUSHCHAIR

[75] Inventors: Andrew N. Wills, London; Charles R. Nixon, Carshalton; Adam M. Lloyd, Winslow, all of England

[73] Assignee: Britax Restmor Limited, England

[21] Appl. No.: 259,630

[22] Filed: Jun. 14, 1994

[30] Foreign Application Priority Data

Jun. 26, 1993 [GB] United Kingdom ............... 9313227

[51] Int. Cl.⁶ .......................................... B62B 7/06
[52] U.S. Cl. ............................... 280/642; 280/650; 280/658
[58] Field of Search ............... 280/642, 647, 650, 658, 280/47.38, 644

[56] References Cited

U.S. PATENT DOCUMENTS

| | | | |
|---|---|---|---|
| 776,665 | 12/1904 | Leadbetter | 280/642 |
| 3,421,774 | 1/1969 | Patterson | 280/642 |
| 4,478,427 | 10/1984 | Hyde et al. | 280/642 |
| 4,660,850 | 4/1987 | Nakao et al. | 280/642 |
| 4,951,766 | 8/1990 | Basedow et al. | 280/304.1 X |
| 4,986,564 | 1/1991 | Liu | 280/642 |
| 5,195,770 | 3/1993 | Ishikura | 280/650 X |

FOREIGN PATENT DOCUMENTS

| | | |
|---|---|---|
| 0475136 | 8/1991 | European Pat. Off. |
| 2333689 | 6/1977 | France |
| 3049060 | 7/1982 | Germany |
| 4004536 | 8/1991 | Germany |
| 252559 | 6/1926 | United Kingdom |
| 770115 | 3/1957 | United Kingdom |
| 1514854 | 6/1978 | United Kingdom |

*Primary Examiner*—Brian L. Johnson
*Attorney, Agent, or Firm*—Davis, Bujold & Streck

[57] ABSTRACT

A pushchair has a frame comprising a pair of rear members, and a pair of front members having intermediate pivot joints which allow their upper and lower parts to pivot relative to one another between a first position in which they are in alignment with one another and a second position in which the pivot joints are displaced forwardly. A seat includes a seat portion which is pivotally secured to the front members of the frame and has its rear end pivotally connected to a pair of telescopic struts extending between the rear members of the frame and the junction of the seat portion and the backrest. The struts are at their minimum length so as to support the seat portion in a substantially horizontal position when the upper and lower parts of the front members are in their first position.

12 Claims, 7 Drawing Sheets

FOLDING PUSHCHAIR

FIELD OF THE INVENTION

This invention relates to a pushchair of the type having a folding frame comprising a pair of rear members, each of which has a respective rear wheel journalled on its bottom end, a pair of handle support members supporting a handle and each rigidly projecting from the upper ends of a respective rear member, a pair of front members, each having its upper end pivotally connected to the upper end of a respective rear member and having a front wheel journalled on its bottom end and a pair of bottom members, each of which is pivotally connected at one end to a respective rear member and at the other end to a respective front member, each front member comprising upper and lower parts which are pivotally interconnected by respective pivot joints which allow the upper and lower parts to pivot relative to one another between a first position in which they are in alignment with one another and a second position in which the pivot joints are further from the rear wheels than when they are in the first position.

RELATED ART

GB-A-770115 discloses a frame of this type for use with a perambulator.

SUMMARY OF THE INVENTION

According to the invention, a pushchair of this type has a seat comprising a backrest and a seat portion which is pivotally secured to the front members of the frame and a pair of struts extending between the rear members of the frame and the junction of the seat portion and the backrest, the struts being arranged to support the seat portion in a substantially horizontal position when the upper and lower parts of the front members are in their first position.

DETAILED DESCRIPTION OF THE PREFERRED EMBODIMENT

Figure 1:
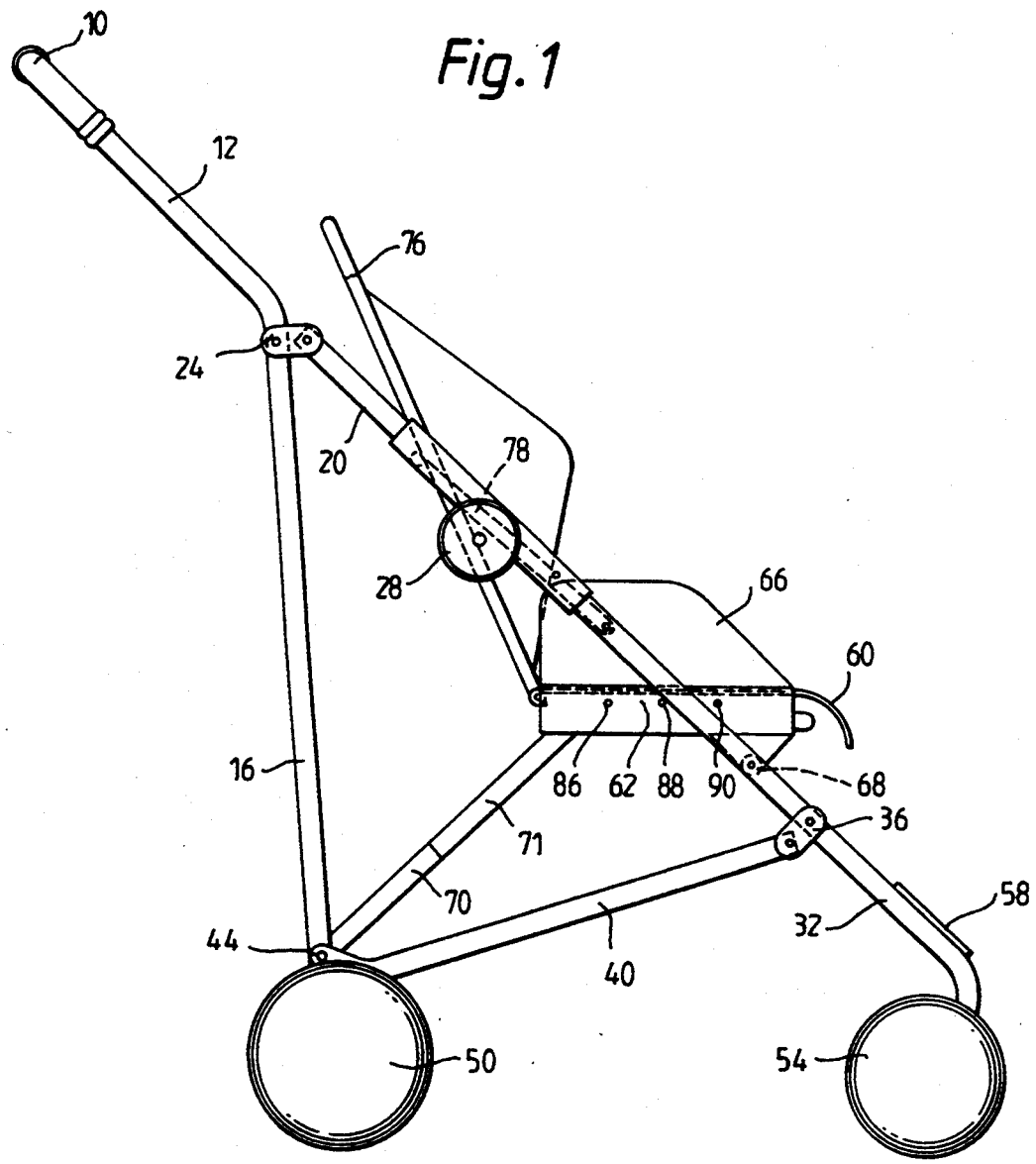
FIG. 1 is a side view of a pushchair in accordance with the invention erected for use and with the seat back in its upright position.
Figure 2:
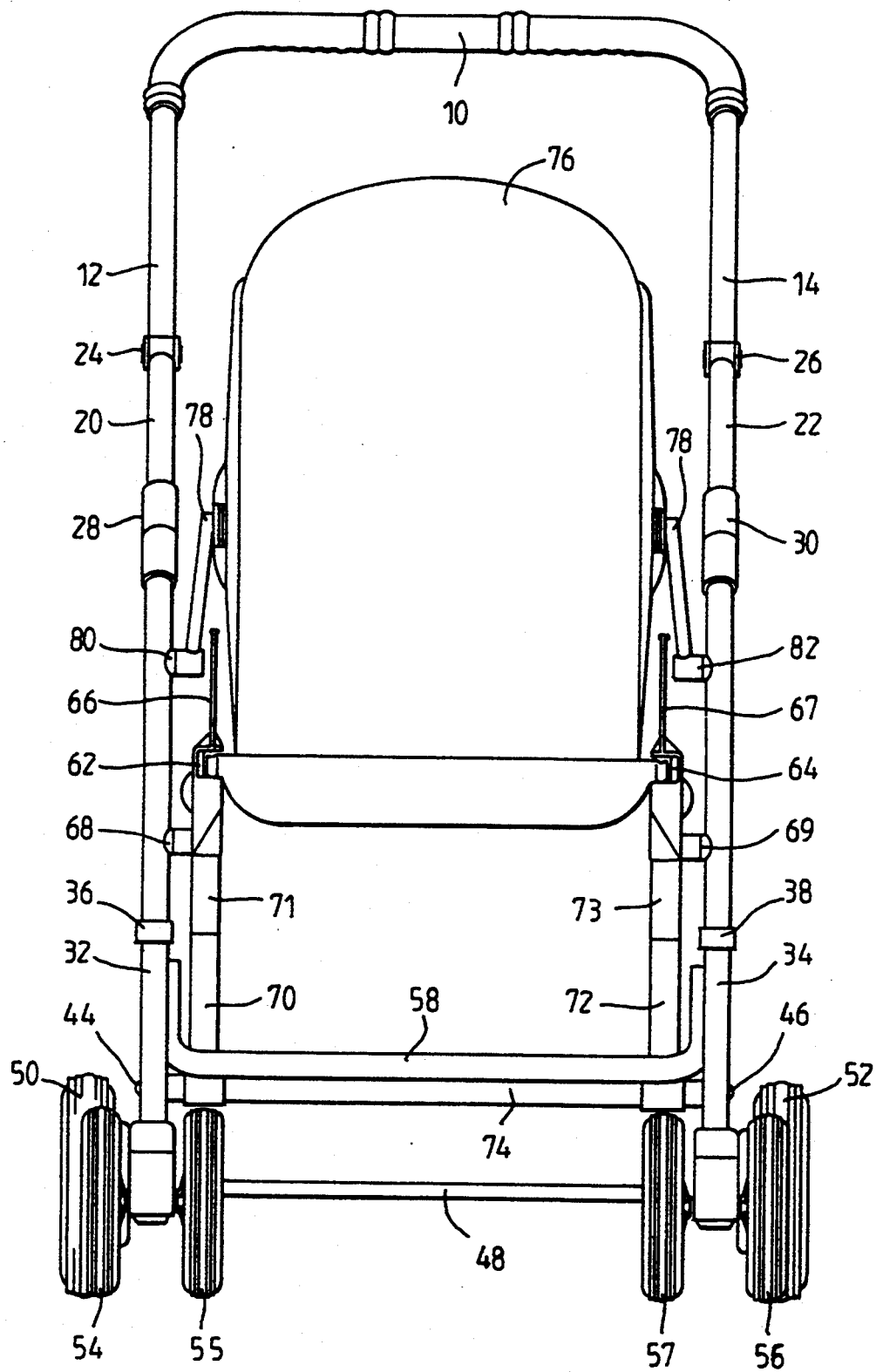
FIG. 2 is a front view of the pushchair shown in FIG. 1.
Figure 3:
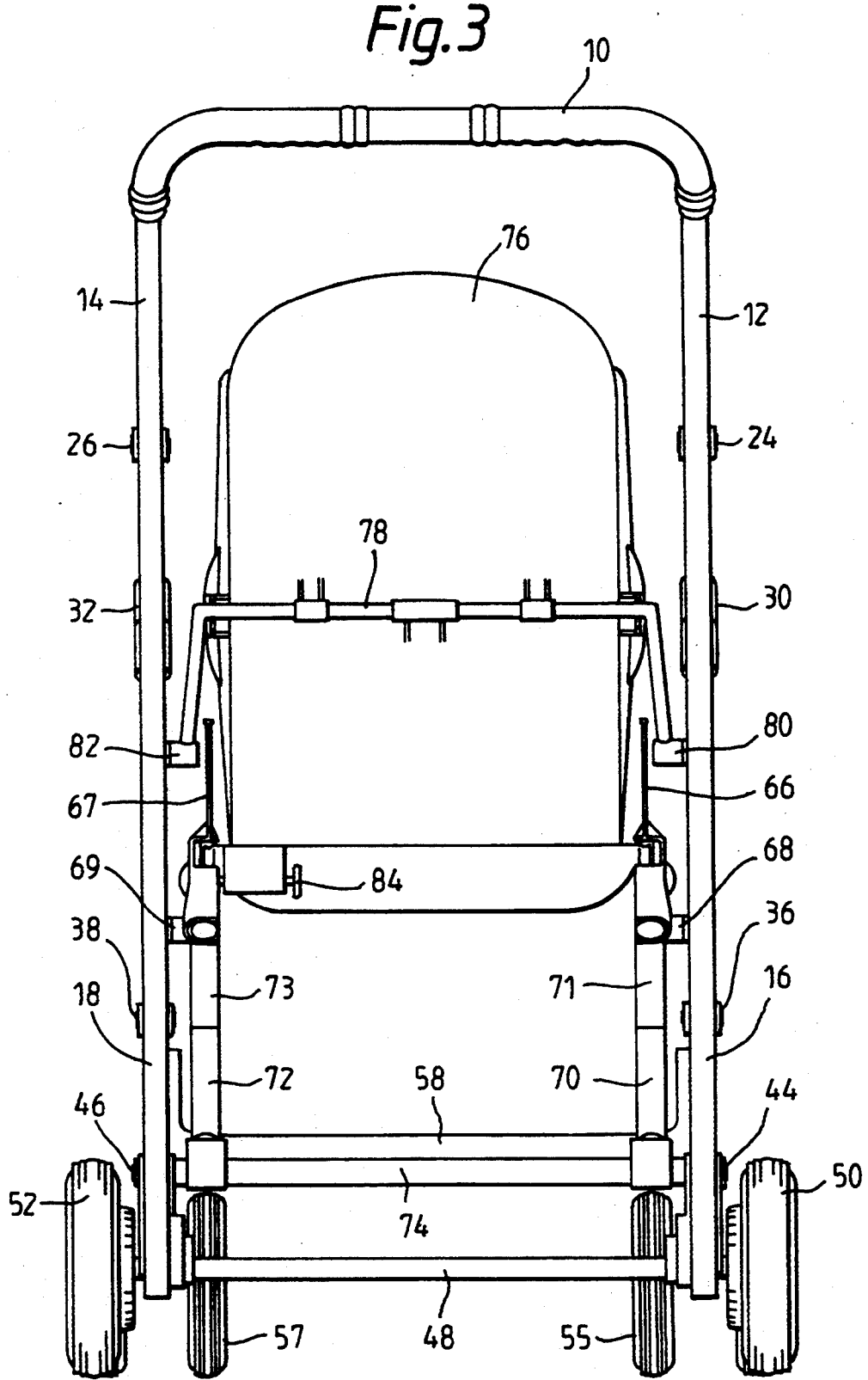
FIG. 3 is a rear view of the pushchair shown in FIG. 1.

Referring to FIGS. 1 and 2, a pushchair comprises a one-piece U-shaped unit forming a handle 10, a pair of handle support members 12 and 14 and a pair of rear members 16 and 18. A respective upper front member 20, 22 is connected by a respective pivot joint 24, 26 to the one-piece U-shaped member 10, 12, 14 at the junctions between the handle support members 12 and 14 and the rear members 16 and 18 respectively. At its lower end, each of the upper front members 20 and 22 is connected by a respective pivot joint 28, 30 to a respective front leg 32, 34. Respective pivot joints 36, 38 at intermediate points on the front legs 28 and 30 are connected to the front end of bottom members 40, the rear ends of which are connected to respective pivot joints 44 and 46 near the bottom ends of the rear legs 16 and 18. Below the pivot joints 44 and 46, the rear legs 16 and 18 support a transverse axle 48 (FIG. 3) on which a pair of rear wheels 50 and 52 are journalled. A respective pair of front wheels 54, 55 and 56, 57 is mounted on castor joints secured to the bottom end of each front leg 32 and 34 so as to be capable of limited pivoting movement about a vertical axis as well as normal rotational movement. The front legs are interconnected by a footrest 58 (FIG. 2).

The pushchair has a generally horizontal seat portion 60, which is slidably mounted in guide channels 62, 64 in respective seat side members 66, 67. The front end of each side members 66, 67 is connected by a respective pivot joint 68, 69 to the front legs 32, 34. Respective two-part telescopic struts 70, 71 and 72, 73 have their rear parts 70 and 72 pivotally attached to a transverse member 74 which extends between the pivot joints 44 and 46 on the rear legs 16 and 18. The front parts 71 and 73 of the telescopic struts support the back ends of the seat side members 66, 67. The struts 70 and 72 are at their minimum length when in the position illustrated in FIG. 1 and can lengthen to permit the pushchair to be folded as will be explained hereinafter.

A backrest 76 is pivotally attached at its bottom end to the rear edge of the seat portion 60 and has its upper parts supported by a U-shaped member 78 (FIG. 3) which has the ends of its limbs attached by pivot joints 80 and 82 to the front legs 32 and 34 respectively. The adjustment of the backrest 76 will be described in more detail hereinafter with reference to FIGS. 6 and 7.

Figure 4:
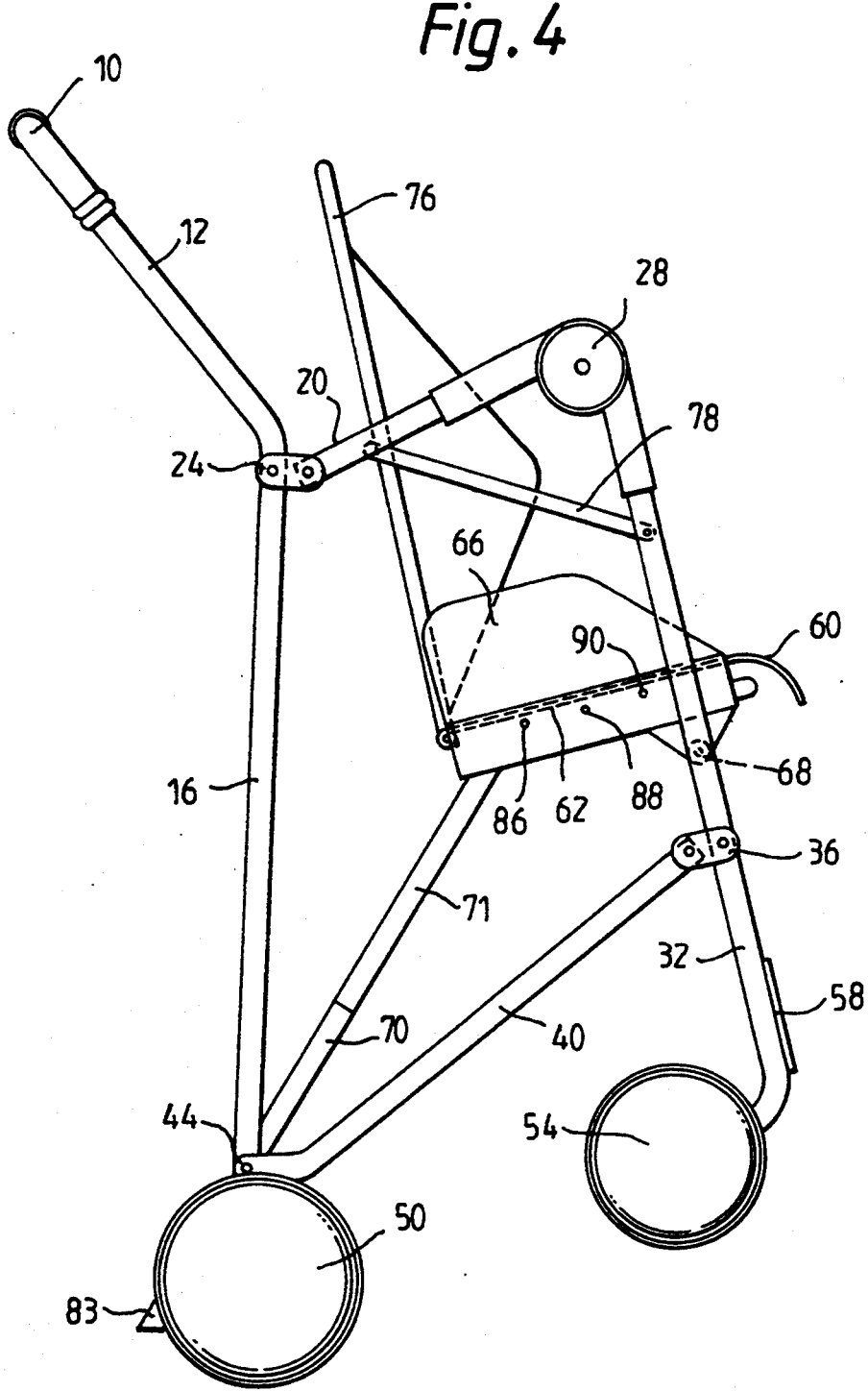
FIG. 4 is a side view of the pushchair shown in FIG. 1 but with the pushchair frame partly folded.
Figure 5:
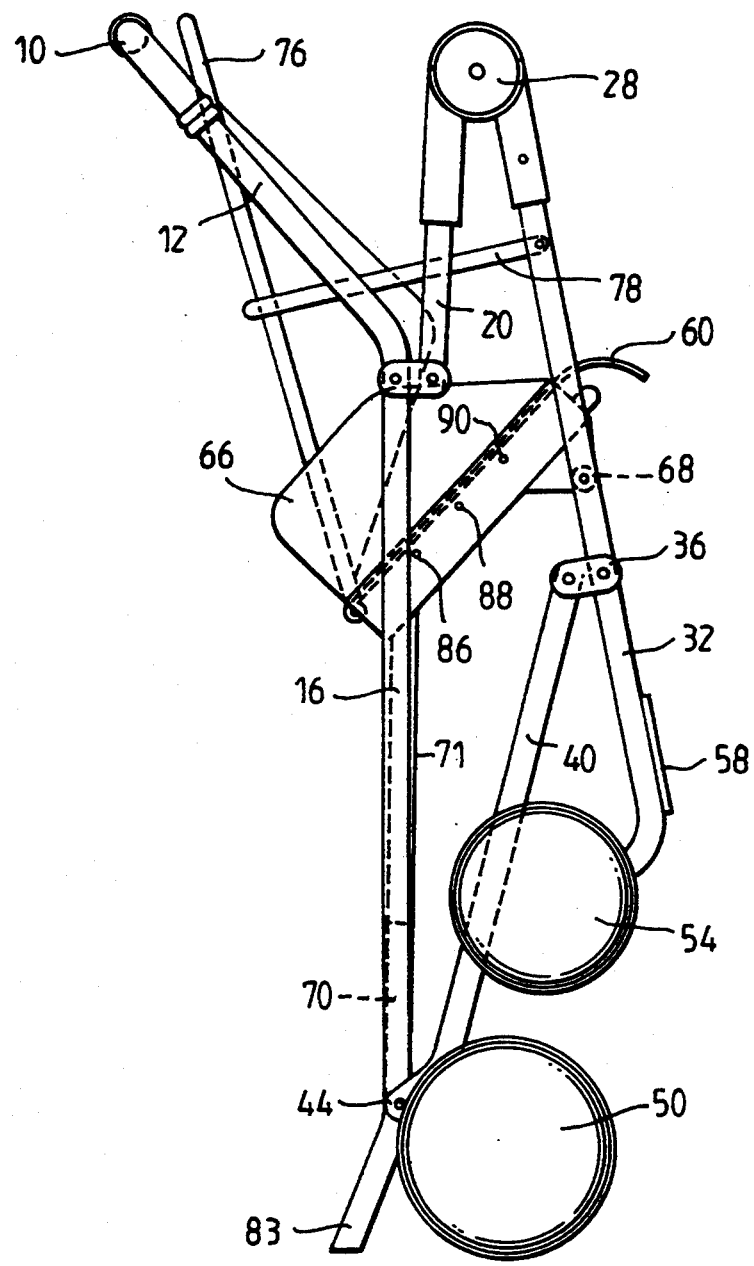
FIG. 5 is a side view of the pushchair shown in FIG. 1 but with the frame fully folded.

The pivot joints 28 and 30 are knuckle joints of known type which prevent angular movement of the upper front members 20 and 22 in the clockwise direction from the position shown in FIG. 1. When the pushchair is to be folded, the joints 24 and 26 are displaced forwardly and upwardly first to the position shown in FIG. 4 and then to the fully folded position shown in FIG. 5, the telescopic struts 70, 72 extending to permit this movement. As can be seen in FIG. 5, the bottom ends 83 of the rear legs 16 and 18 project level with the bottom of the periphery of the rear wheels 50, and 52 so as to allow the pushchair to be stood on end when folded.

Figure 6:
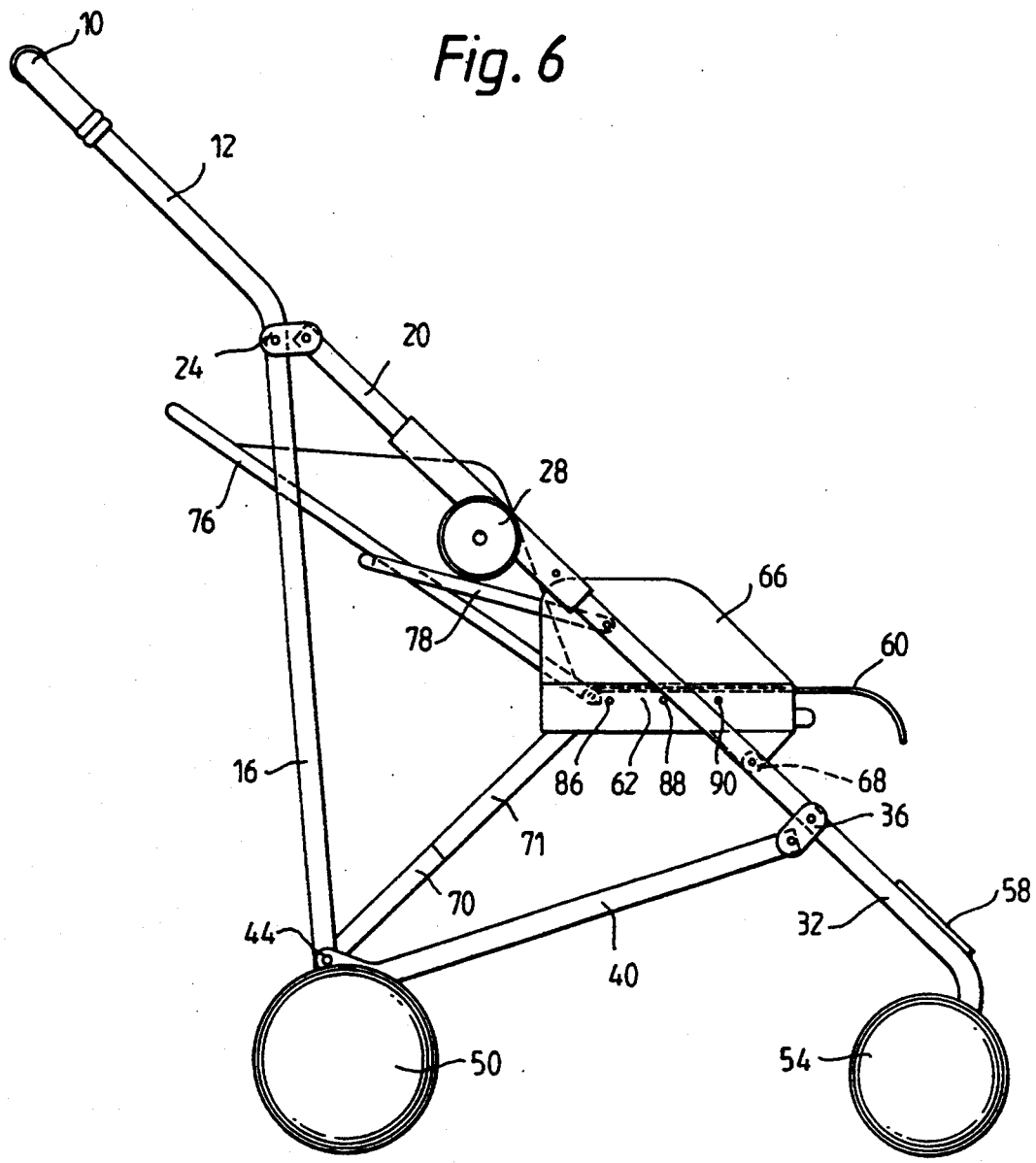
FIG. 6 is a side view of the pushchair shown in FIG. 1 but with the seat back in a partly reclined position.

When the backrest 76 is in the position shown in FIG. 1, a spring-loaded bolt 84 (FIG. 3), mounted on the underside of the seat portion 60, engages with a hole 86 in one of the side members 66, 67. Disengagement of the bolt 84 from the hole 86 allows the seat portion 60 to slide forwards so that the backrest 76 is positioned in a partly reclined position as shown in FIG. 6, the bolt 84 engaging in a second hole 88.

Figure 7:
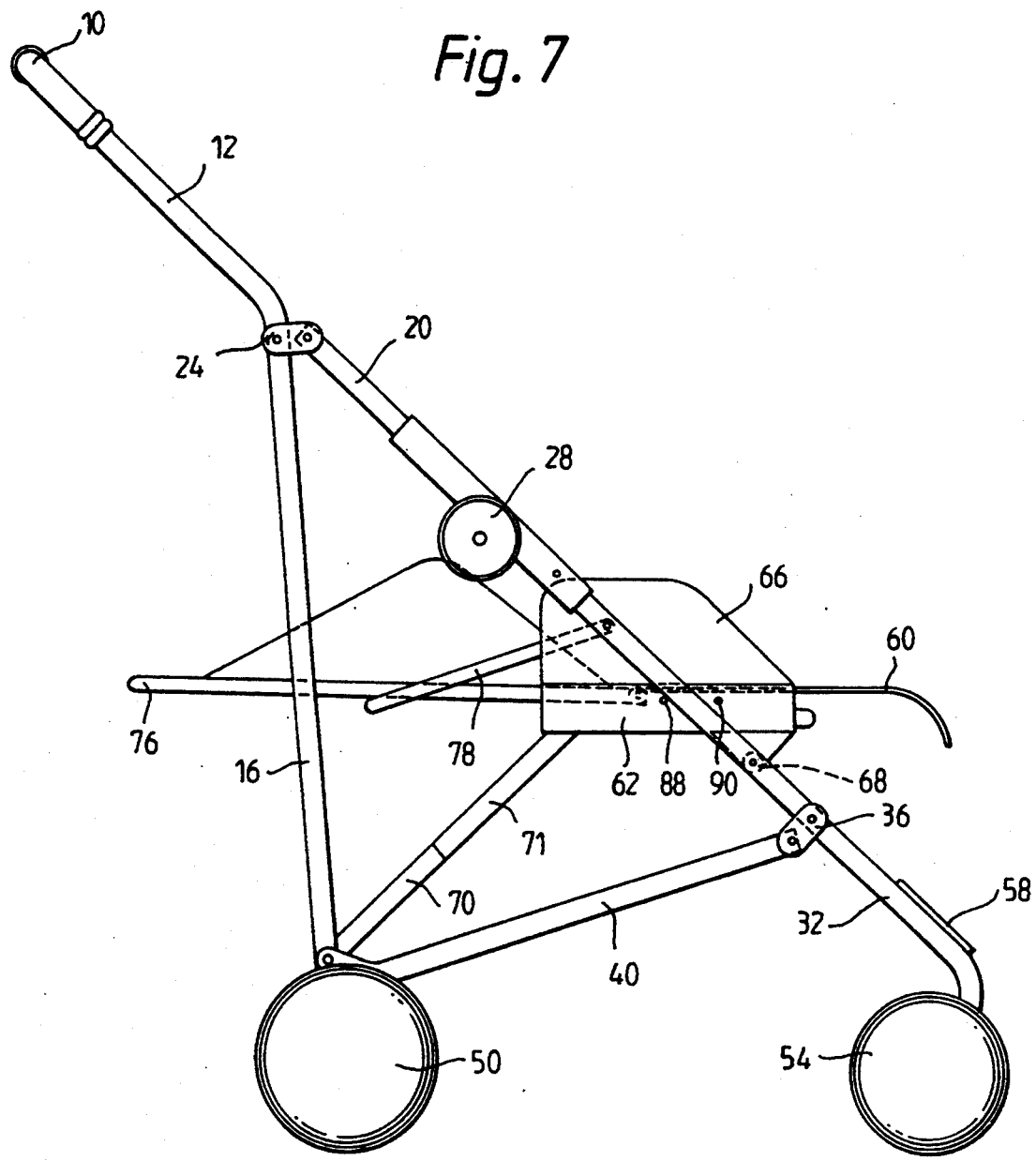
FIG. 7 is a side view of the pushchair shown in FIG. 1 but with the seat back in its fully reclined position.

The seat portion 60 can slide further forwards to put the backrest 76 in a horizontal position level with the seat 60 as shown in FIG. 7, the bolt 84 engaging in a third hole 90. In this position, an infant can be positioned either with his head towards the handle 10, or with his head away from the handle 10 so as to face an adult pushing the pushchair. The hole 86 is not shown in FIG. 7 because it would obscure the pivot for the backrest 76.

The simultaneous forward sliding movement of the seat portion 60 and rearward reclining motion of the backrest 76 minimises the movement of the center of gravity of a child occupying the pushchair relative to the wheels 50–57. It is good safety practice (and, in some countries necessary to meet safety regulations) to ensure that the combined center of gravity of the child and the pushchair remains forward of the rear wheels 50, 52 when the pushchair is tilted rearwardly by 12°, for example by pushing downwards on the handle 10.

We claim:

1. A pushchair having a frame comprising
   a pair of rear members, each of which has a bottom end and an upper end,
   a respective rear wheel journalled on the bottom end of each rear member,
   a pair of handle support members supporting a handle and each rigidly projecting from the upper ends of a respective rear member,
   a pair of front members, each front member having a upper end pivotally connected to the upper end of a respective rear member and each front member comprising upper and lower parts which are pivotally interconnected by respective pivot joints which allow the upper and lower parts to pivot relative to one another between a first position in which said upper and lowest parts are in alignment with one another and a second position in which the pivot joints are further from the rear wheels than when in the first position,
   a front wheel journalled on the bottom end of each front member,
   a pair of bottom members, each of which is pivotally connected at a first end to a respective rear member and at a second end to a respective front member,
   a seat comprising a seat portion which is pivotally secured to the front members of the frame and a backrest secured by a pivot joint to the seat portion, and
   a pair of struts supported on the rear members of the frame and coupled to the seat portion behind the front members of the frame so as to support the seat portion in a substantially horizontal position when the upper and lower parts of the front members are in their first position.

2. A pushchair according to claim 1, wherein each strut comprises a lower part connected telescopically to an upper part so that the strut is in a condition of minimum length when the upper and lower parts of the front members are in the first position.

3. A pushchair according to claim 2, wherein the seat portion is horizontally slidable relative to the front members and the struts, and the pivot joint between the backrest and the seat portion is arranged to allow movement of the backrest between a position substantially in alignment with seat portion when the seat is in seat portion is in a foremost position, foremost position, and a substantially upright position when the seat portion is in a rearmost position.

4. A pushchair according to any claim 3, wherein the two handle support members and the handle comprise a single U-shaped unit.

5. A pushchair according to claim 4, wherein each rear member is formed integrally with the corresponding handle support member.

6. A pushchair according to claim 1, wherein the seat portion is horizontally slidable relative to the front members and the struts, and the pivot joint between the backrest and the seat portion is arranged to allow movement of the backrest between a position substantially in alignment with the seat portion when the seat portion is in a foremost position and a substantially upright position when the seat portion is in a rearmost position.

7. A pushchair according to claim 6, wherein each rear member is formed integrally with the corresponding handle support member.

8. A pushchair according to claim 7, wherein the two handle support members and the handle comprise a single U-shaped unit.

9. A pushchair according to claim 2, wherein each rear member is formed integrally with the corresponding handle support member.

10. A pushchair according to claim 9, wherein the two handle support members and the handle comprise a single U-shaped unit.

11. A pushchair according to claim 1, wherein each rear member is formed integrally with the corresponding handle support member.

12. A pushchair according to claim 11, wherein the two handle support members and the handle comprise a single U-shaped unit.

* * * * *